(12) United States Patent
Dran

(10) Patent No.: US 6,647,670 B1
(45) Date of Patent: Nov. 18, 2003

(54) AUTOMATIC DOWN SPOUT EXTENSION

(76) Inventor: Michael Dran, 2221 Gray St., Edgewater, CO (US) 80214

( * ) Notice: Subject to any disclaimer, the term of this patent is extended or adjusted under 35 U.S.C. 154(b) by 0 days.

(21) Appl. No.: 10/159,630

(22) Filed: May 31, 2002

(51) Int. Cl.[7] ............... E04D 13/08; E04D 13/00; E03B 1/00; F16L 5/00
(52) U.S. Cl. ............... 52/16; 52/12; 137/357; 137/615
(58) Field of Search ............... 52/16, 12; 137/615, 137/357, 355.25

(56) References Cited

U.S. PATENT DOCUMENTS

| | | | |
|---|---|---|---|
| 3,375,851 A | * 4/1968 | Henry et al. | ................. 137/396 |
| 3,911,954 A | 10/1975 | Johnson | |
| 5,452,743 A | * 9/1995 | Rortvedt | ..................... 137/615 |
| 5,522,427 A | * 6/1996 | Johnson | ................... 137/616.5 |
| 5,673,519 A | 10/1997 | McCaughan | |
| 5,735,085 A | * 4/1998 | Denooy | ......................... 52/16 |
| 5,862,632 A | 1/1999 | Zima | |
| 6,240,680 B1 | 6/2001 | Estes | |
| 2002/0095876 A1 | * 7/2002 | Frey | ............................... 52/16 |

* cited by examiner

*Primary Examiner*—Carl D. Friedman
*Assistant Examiner*—Kevin McDermott
(74) *Attorney, Agent, or Firm*—Roger A. Jackson

(57) ABSTRACT

An automatic down spout extension system including an extension spout pivotally attached to the lower end of a down spout, and a ballast container attached to the distal end of the extension spout. An insert including a number of side openings is attached at the upper end of the down spout, and a hose extends from the bottom of the insert to the ballast container. Rainwater from the rain gutter flows down the down spout and a portion of the water flows through the hose and fills the ballast container at the end of the extension spout. The weight of the water in the ballast container causes the extension spout to move to an extended working position. A spring interconnecting the extension spout and the down spout biases the extension spout in an upright storage position. A drain opening in the ballast container allows water to run out, and when the rain stops and the container empties, the spring pulls the extension spout to an upright storage position.

12 Claims, 1 Drawing Sheet

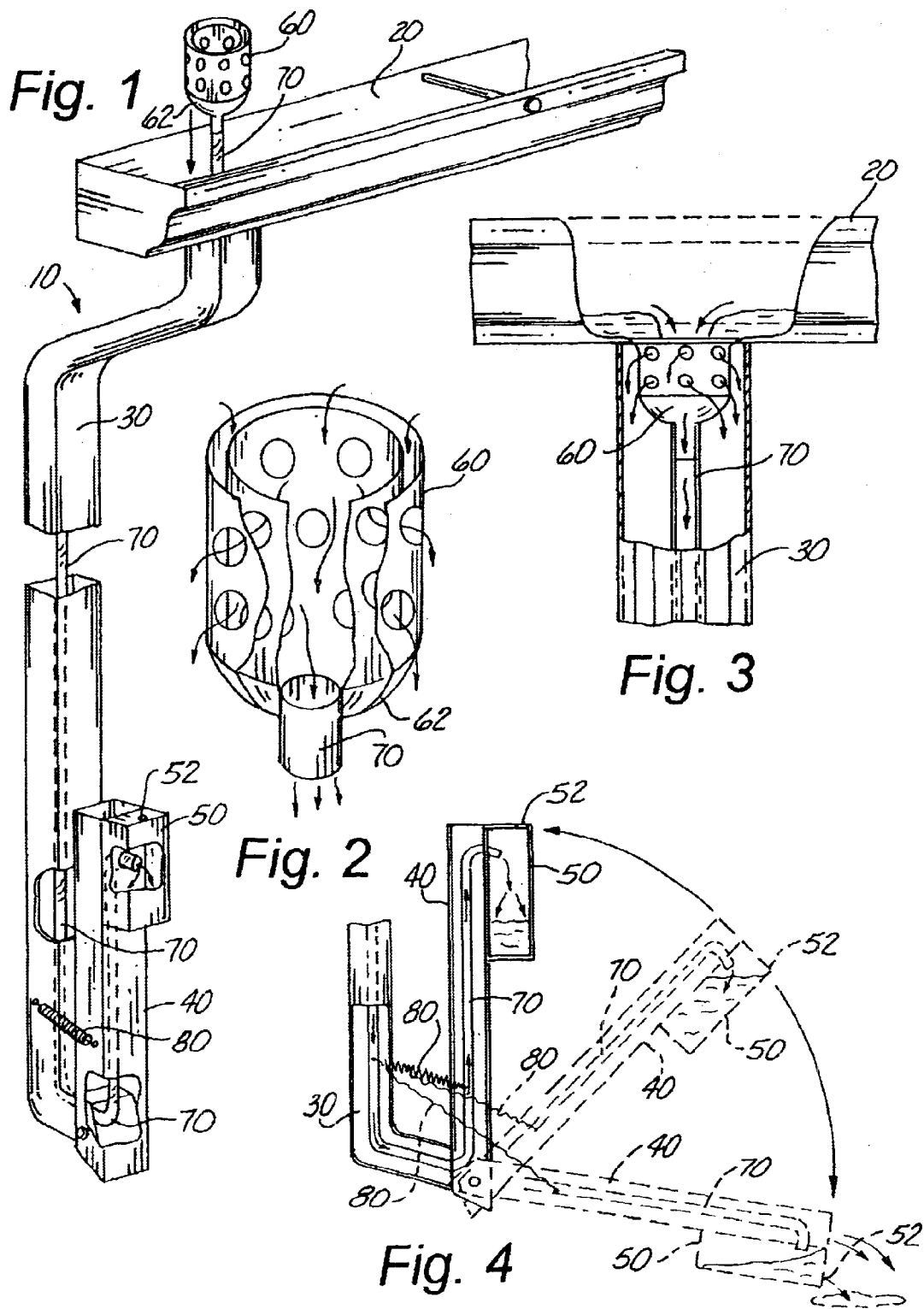

AUTOMATIC DOWN SPOUT EXTENSION

BACKGROUND OF THE INVENTION

1. Field of the Invention

The present invention relates to the field of rainwater down spouts, and more particularly to a down spout extension that is automatically moved from a storage position to an extended working position.

2. Description of the Related Art

As can be seen by reference to the following U.S. Pat. Nos. 3,911,954; 5,673,519; 5,862,632; and 6,240,680, the prior art is replete with myriad and diverse down spout extensions.

While all of the aforementioned prior art constructions are more than adequate for the basic purpose and function for which they have been specifically designed, they are uniformly deficient with respect to their failure to provide a simple, efficient, and practical automatic down spout extension.

As a consequence of the foregoing situation, there has existed a longstanding need for a new and improved automatic down spout extension, and the provision of such a device is a stated objective of the present invention.

BRIEF SUMMARY OF THE INVENTION

Briefly stated, the present invention provides an automatic down spout extension system including an extension spout pivotally attached to the lower end of a down spout, and a ballast container attached to the distal end of the extension spout. An insert including a number of side openings is attached at the upper end of the down spout, and a hose extends from the bottom of the insert to the ballast container. Rainwater from the rain gutter flows down the down spout and a portion of the water flows through the hose and fills the ballast container at the end of the extension spout. The weight of the water in the ballast container causes the extension spout to move to an extended working position. A spring interconnecting the extension spout and the down spout biases the extension spout in an upright storage position. A drain opening in the ballast container allows water to run out, and when the rain stops and the container empties, the spring pulls the extension spout to an upright storage position.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is an exploded perspective view of the down spout extension system with portions cut away to show the path of the hose that fills the ballast container;

FIG. 2 is an enlarged perspective view of the insert that is attached to the top of the hose;

FIG. 3 is a side elevation partial sectional view showing the insert positioned at the upper end of the down spout; and FIG. 4 is a side elevation partial sectional view showing the spout extension moving between the upright storage position and the extended working position.

DETAILED DESCRIPTION OF THE INVENTION

As can be seen by reference to the drawings, and in particular to FIG. 1, the down spout extension system that forms the basis of the present invention is designated generally by the reference number 10. The down spout extension system 10 includes a standard rain gutter 20 and connected down spout 30, together with a spout extension 40. The spout extension 40 has a proximal end pivotally attached to the lower end of the down spout 30. The distal end of the spout extension 40 carries a ballast container 50 with a drain opening 52. An insert 60 is attached at the upper end of the down spout 30 in fluid communication with the rain gutter 20. As best shown in FIGS. 2 and 3, the insert 60 has a number of openings formed in the top enlarged portion. A hose 70 is attached to the outlet of the funnel shaped bottom 62 of the insert 60. The hose 70 extends through the down spout 30, through the spout extension 40, and into the ballast container. 50. A spring 80 interconnects the down spout 30 and spout extension 40.

In use, the spring 80 biases the spout extension 40 to the upright storage position shown in full line in FIGS. 1 and 4. As rain water runs from the gutter 20 it fills the insert 60 and water runs from the funnel shaped bottom 62 into the hose 70 which fills the ballast container 50. When the hose 70 can no longer handle the volume of water, the water will flow from the openings in the top of the insert 60 and down the down spout 30 as illustrated in FIG. 3. By this time the weight of the water in the ballast container 50 has overcome the biasing force of the spring 80 and the spout extension has moved to the extended working position shown in dashed lines in FIG. 4.

As the rain stops, the drain opening 52 in the container 50 allows water to escape. When the weight of the water in the container 50 is decreased sufficiently, the force of the spring 80 pulls the spout extension 40 back to the upright storage position.

The spout extension 40 automatically drops and directs water away from the house which prevents damage to the foundation and basement flooding. Thus, the homeowner need not go outside to lower the extension 40 every time it rains. The homeowner could even be away on a trip, at work, or on an errand. Further, when the rain stops, the extension 40 automatically moves up to the storage position out of the way of lawncare equipment used to trim grass in the area.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A down spout extension system, comprising:

a rain gutter having a bottom opening;

a down spout having an upper end attached to the bottom opening of the gutter and having a lower end extending down toward a ground surface;

an extension spout having a proximal end pivotally attached to the lower end of the down spout and having a distal end movable between an upright storage position and an extended working position;

an insert disposed within the upper end of the down spout in fluid communication with the gutter;

a hose attached to the insert and disposed to extend within the down spout and within the extension spout to the distal end thereof; and a ballast container attached to the distal end of the extension spout and disposed in fluid communication with the gutter through the hose.

2. The system of claim 1 wherein the extension spout is biased toward the upright storage position.

3. The system of claim 2 wherein a spring interconnects the extension spout and the down spout.

4. The system of claim 1 wherein the insert is sized smaller than the down spout and wherein the insert includes a plurality of openings formed therein providing fluid communication between the gutter and the down spout.

5. The system of claim 2 wherein the insert is sized smaller than the down spout and wherein the insert includes a plurality of openings formed therein providing fluid communication between the gutter and the down spout.

6. The system of claim 3 wherein the insert is sized smaller than the down spout and wherein the insert includes a plurality of openings formed therein providing fluid communication between the gutter and the down spout.

7. The system of claim 1 wherein the ballast container includes a drain opening operable to allow fluid flow from the ballast container when the extension spout is in the extended working position.

8. The system of claim 2 wherein the ballast container includes a drain opening operable to allow fluid flow from the ballast container when the extension spout is in the extended working position.

9. The system of claim 3 wherein the ballast container includes a drain opening operable to allow fluid flow from the ballast container when the extension spout is in the extended working position.

10. The system of claim 4 wherein the ballast container includes a drain opening operable to allow fluid flow from the ballast container when the extension spout is in the extended working position.

11. The system of claim 5 wherein the ballast container includes a drain opening operable to allow fluid flow from the ballast container when the extension spout is in the extended working position.

12. The system of claim 6 wherein the ballast container includes a drain opening operable to allow fluid flow from the ballast container when the extension spout is in the extended working position.

\* \* \* \* \*